US 6,685,515 B1

(12) United States Patent
Satoh et al.

(10) Patent No.: US 6,685,515 B1
(45) Date of Patent: Feb. 3, 2004

(54) OVERHEAT DETECTION SYSTEM FOR OUTBOARD MOTOR

(75) Inventors: Kazuhiro Satoh, Wako (JP); Sou Abe, Wako (JP); Nobuhiro Takahashi, Takanezawa-machi (JP)

(73) Assignees: Honda Giken Kogyo Kabushiki Kaisha, Tokyo (JP); Keihin Corporation, Tokyo (JP)

( * ) Notice: Subject to any disclaimer, the term of this patent is extended or adjusted under 35 U.S.C. 154(b) by 0 days.

(21) Appl. No.: 10/267,993

(22) Filed: Oct. 10, 2002

(30) Foreign Application Priority Data

Oct. 12, 2001 (JP) ........................................ 2001-315850

(51) Int. Cl.[7] .................................................. B60L 1/14
(52) U.S. Cl. ........................................ 440/2; 440/88 R
(58) Field of Search ................................. 440/2, 88 R

(56) References Cited

U.S. PATENT DOCUMENTS 4,938,721 A * 7/1990 Koike ........................... 440/2
4,951,624 A * 8/1990 Hirano ..................... 123/198 D
5,769,055 A * 6/1998 Motose et al. ............... 123/478
6,015,317 A * 1/2000 Hoshiba et al. ................ 440/1

FOREIGN PATENT DOCUMENTS

JP    11-200862    7/1999

* cited by examiner

Primary Examiner—Jesus D. Sotelo
(74) Attorney, Agent, or Firm—Westerman Hattori Daniels & Adrian LLP

(57) ABSTRACT

A system for detecting overheat of an internal combustion engine for an outboard motor. In the system, when an elapsed time since engine staring is within a predetermined time, a detected engine temperature is equal to or greater than a first predetermined temperature and an detected engine speed exceeds an idling speed; a threshold value (compared with the detected engine temperature to determine the engine overheating) is changed to be increased. With this, even if the detected engine temperature is higher than a true or actual temperature at, for example, a high engine load immediately after engine starting or when the engine has been left in the idling state, the system can prevent it from being determined unnecessarily as the overheated condition.

12 Claims, 7 Drawing Sheets

OVERHEAT DETECTION SYSTEM FOR OUTBOARD MOTOR

BACKGROUND OF THE INVENTION

1. Field of the Invention

This invention relates to an overheat detection system for an outboard motor, more particularly an overheat detection system of an internal combustion engine for an outboard motor for small boats

2. Description of the Related Art

Small motor-driven boats are generally equipped with a propulsion unit including an internal combustion engine, propeller shaft and propeller integrated into what is called an outboard motor or engine. The outboard motor is mounted on the outside of the boat and the output of the engine is transmitted to the propeller through a clutch and the propeller shaft. The boat can be propelled forward or backward by moving the clutch from Neutral to Forward or Reverse position.

The engine is usually provided with an overheat detection system which detects the engine temperature by a sensor and if the detected engine temperature is found to exceed a permissible temperature, it determines that the engine is overheated and warns the operator. For example, Japanese Laid-Open Patent Application No. Hei 11 (1999)-200862 teaches such an overheat detection for an engine mounted on a tractor.

While this prior art system is for an engine mounted on a machine used on land, when the engine is an outboard engine, sea or lake water is used for engine cooling. Specifically, when the outboard engine has been warmed, a thermostat provided in the engine cooling passage is opened to introduce sea walter (or lake water) into the engine to cool the same.

Disadvantageously, the temperature sensor may, depending on its location, indicate a temperature higher than a true or actual engine temperature, due to a response lag in the thermostat or the layout of the cooling passage, which makes it difficult to detect an engine overheated condition accurately. This disadvantageous is serious at high engine load immediately after engine starting.

SUMMARY OF THE INVENTION

An object of the present invention is therefore to solve the problem by providing an overheat detection system of an internal combustion engine for an outboard motor, which can detect the overheat condition accurately, even if the temperature sensor, depending on its location, indicates a temperature higher than a true temperature at the time of, for example, high engine load immediately after engine starting.

For realizing this object, there is provided a system for detecting overheat of an internal combustion engine for an outboard motor mounted on a boat, whose output is connected to a propeller such that the boat is propelled forward or reverse, comprising: a temperature sensor, installed at the engine, which outputs a signal indicative of a temperature of the engine; a crank angle sensor, installed at the engine, which outputs a signal indicative of a speed of the engine; time measuring means for measuring a period of time since starting of the engine; time determining means for determining whether the measured time is within a predetermined first period of time; temperature determining means for determining whether the detected engine temperature is equal to or greater than a first predetermined temperature; engine speed determining means for determining whether the detected engine speed exceeds a predetermined speed; threshold value changing means for changing a threshold value to a value set in a temperature-increasing direction, when the measured time is determined to be within the predetermined first period of time, the detected engine temperature is determined to be equal to or greater than the first predetermined temperature and the detected engine speed is determined to exceed the predetermined speed; and overheat determining means for comparing the detected engine temperature with the threshold value and for determining that the engine is overheated when the detected engine temperature is determined to exceed the threshold value.

BRIEF DESCRIPTION OF THE DRAWINGS

The objects and advantages of the invention will be made apparent with reference to the following descriptions and drawings, in which.

DETAILED DESCRIPTION OF THE PREFERRED EMBODIMENT

An overheat detection system of an internal combustion engine for an outboard motor according to an embodiment of the present invention will now be explained with reference to the attached drawings.

Figure 1:
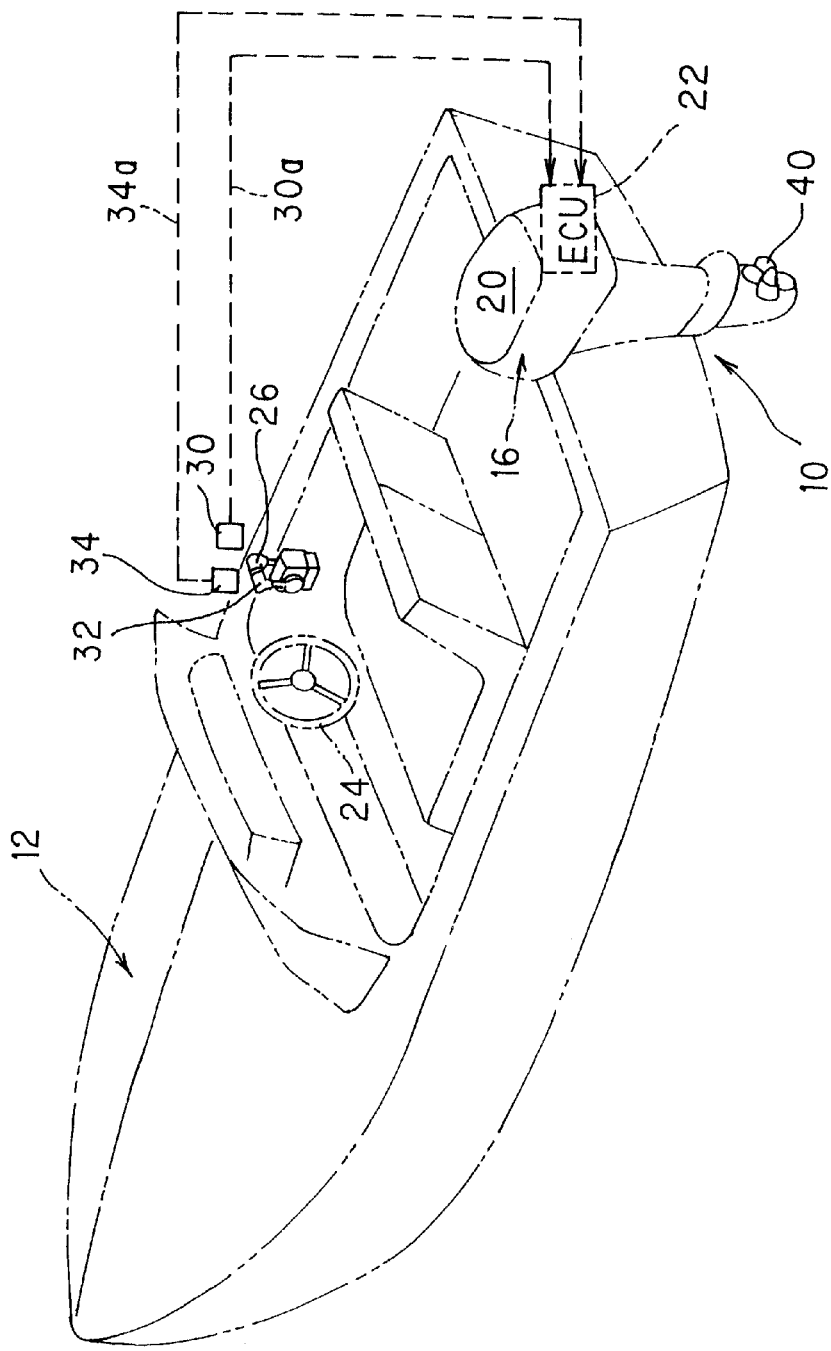
FIG. 1 is a schematic view showing the overall configuration of an overheat detection system for an outboard motor equipped with an internal combustion engine according to embodiment of the present invention.
Figure 2:
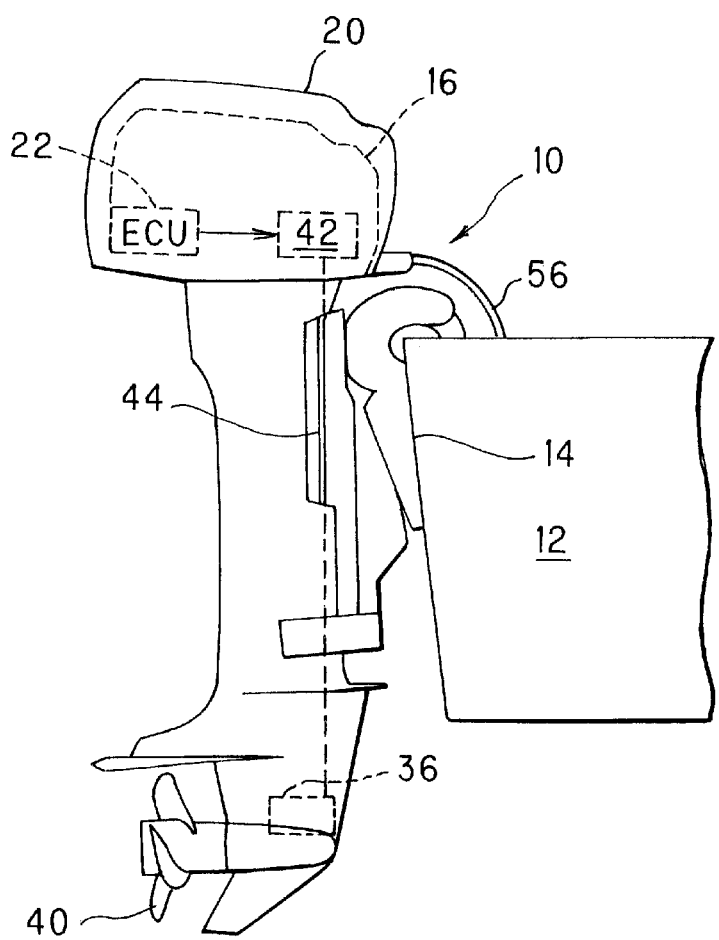
FIG. 2 is an enlarged side view of one portion of FIG. 1.

FIG. 1 is a schematic view showing the overall configuration of the overheat detection system of an internal combustion engine for an outboard motor and FIG. 2 is an enlarged side view of one portion of FIG. 1.

Reference numeral 10 in FIGS. 1 and 2 designates the aforesaid propulsion unit including an internal combustion engine, propeller shaft and propeller integrated into what is hereinafter called an "outboard motor." The outboard motor 10 is mounted on the stern of a boat (small craft) 12 by a clamp unit 14 (see FIG. 2).

As shown in FIG. 2, the outboard motor 10 is equipped with the internal combustion engine (hereinafter called the "engine") 16. The engine 16 is a spark-ignition V-6 gasoline engine. The engine is positioned above the water surface and is enclosed by an engine cover 20 of the outboard motor 10. An electronic control unit (ECU) 22 composed of a microcomputer is installed near the engine 16 enclosed by the engine cover 20.

As shown in FIG. 1, a steering wheel 24 is installed in the cockpit of the boat 12. When the operator turns the steering wheel 24, the rotation is transmitted to a rudder (not shown) fastened to the stern through a steering system not visible in the drawings, changing the direction of boat advance.

A throttle lever 26 is mounted on the right side of the cockpit and near it is mounted a throttle lever position sensor 30 that outputs a signal corresponding to the position of the throttle lever 26 set by the operator.

A shift lever 32 is provided adjacent to the throttle lever 26 and next to it is installed a neutral switch 34 that outputs an ON signal when the operator puts the shift lever 32 in Neutral and outputs an OFF signal when the operator puts the shift lever 32 in Forward or Reverse. The outputs from the throttle lever position sensor 30 and neutral switch 34 are sent to the ECU 22 through signal lines 30a and 34a.

The output of the engine 16 is transmitted through a crankshaft and a drive shaft (neither shown) to a clutch 36 of the outboard engine 10 located below the water surface. The clutch 36 is connected to a propeller 40 through a propeller shaft (not shown).

The clutch 36, which comprises a conventional gear mechanism, is omitted from the drawing. It is composed of a drive gear that rotates unitarily with the drive shaft when the engine 16 is running, a forward gear, a reverse gear, and a dog (sliding clutch) located between the forward and reverse gears that rotates unitarily with the propeller shaft. The forward and reverse gears are engaged with the drive gear and rotate idly in opposite directions on the propeller shaft.

The ECU 22 is responsive to the output of the neutral switch 34 received on the signal line 34a for driving an actuator (electric motor) 42 via a drive circuit (not shown) so as to realize the intended shift position. The actuator 42 drives the dog through a shift rod 44.

When the shift lever 32 is put in Neutral, the engine 16 and the propeller shaft are disconnected and can rotate independently. When the shift lever 32 is put in Forward or Reverse position, the dog is engaged with the forward gear or the reverse gear and the rotation of the engine 16 is transmitted through the propeller shaft to the propeller 40 to drive the propeller 40 in the forward direction or the opposite (reverse) direction and thus propel the boat 12 forward or backward.

The engine 16 will now be explained with reference to FIGS. 3 and 4.

Figure 3:
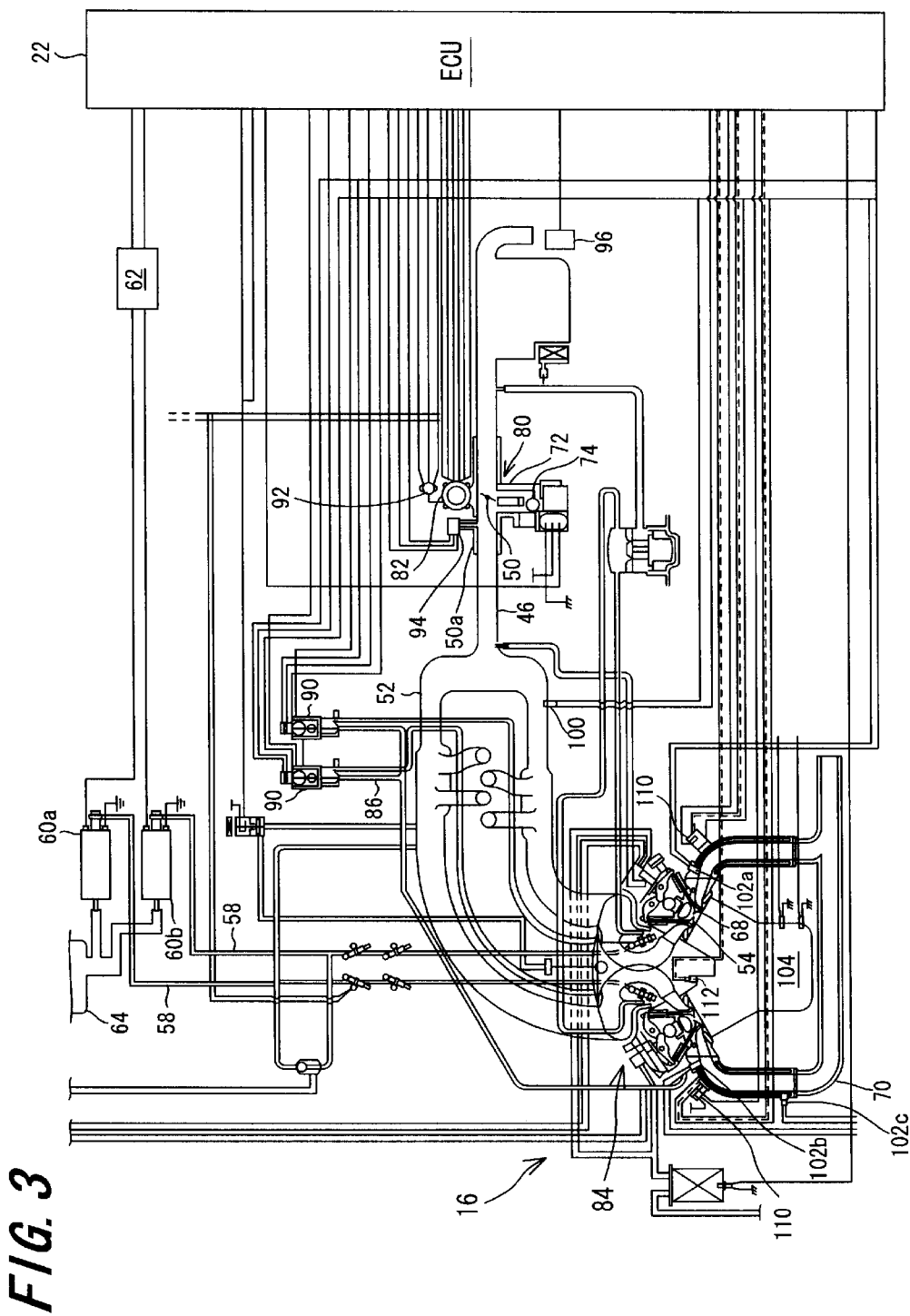
FIG. 3 is a schematic diagram showing details of the engine of the motor shown in FIG. 1.

As shown in FIG. 3, the engine 16 is equipped with an air intake pipe 46. Air drawn in through an air cleaner (not shown) is supplied to intake manifolds 52 provided one for each of left and right cylinder banks disposed in V-like shape as viewed from the front, while the flow thereof is adjusted by a throttle valve 50, and finally reaches an intake valves 54 of the respective cylinders. An injector 56 (not shown in FIG. 3) is installed in the vicinity of each intake valve (not shown) for injecting fuel (gasoline).

The injectors 56 are connected through two fuel lines 58 provided one for each cylinder bank to a fuel tank (not shown) containing gasoline. The fuel lines 58 pass through separate fuel pumps 60a and 60b equipped with electric motors (not shown) that are driven via a relay circuit 62 so as to send pressurized gasoline to the injectors 56. Reference numeral 64 designates a vaporized fuel separator.

The intake air is mixed with the injected gasoline to form an air-fuel mixture that passes into the combustion chamber (not shown) of each cylinder, where it is ignited by a spark plug 66 (not shown in FIG. 3) to burn explosively and drive down a piston (not shown). The so-produced engine output is taken out through a crankshaft. The exhaust gas produced by the combustion passes out through exhaust valves 68 into exhaust manifolds 70 provided one for each cylinder bank and is discharged to the exterior of the engine.

As illustrated, a branch passage 72 for secondary air supply is formed to branch off from the air intake pipe 46 upstream of the throttle valve 50 and rejoin the air intake pipe 46 downstream of the throttle valve 50. The branch passage 72 is equipped with an electronic secondary air control valve (EACV) 74.

The EACV 74 is connected to the ECU 22. The ECU 22 calculates a current command value that it supplies to the EACV 74 so as to drive the EACV 74 for regulating the opening of the branch passage 72. The branch passage 72 and the EACV 74 thus constitute a secondary air supplier 80 for supplying secondary air in proportion to the opening of the EACV 74.

The throttle valve 50 is connected to an actuator (stepper motor) 82. The actuator 82 is connected to the ECU 22. The ECU 22 calculates a current command value proportional to the output of the throttle lever position sensor 30 and supplies it to the actuator 82 through a drive circuit (not shown) so as to regulate the throttle opening or position TH.

More specifically, the actuator 82 is directly attached to a throttle body 50a housed in the throttle valve 50 with its rotating shaft (not shown) oriented to be coaxial with the throttle valve shaft. In other words, the actuator 82 is attached to the throttle body 50a directly, not through a linkage, so as to simplify the structure and save mounting space. Thus, in this embodiment, the push cable is eliminated and the actuator 82 is directly attached to the throttle body 50a for driving the throttle valve 50.

The engine 16 is provided in the vicinity of the intake valves 54 and the exhaust valves 68 with a variable valve timing system 84. When engine speed and load are relatively high, the variable valve timing system 84 switches the valve open time and lift to relatively large values (Hi V/T). When the engine speed and load are relatively low, it switches the valve open time and lift to relatively small values (Lo V/T).

The exhaust system and the intake system of the engine 16 are connected by EGR (exhaust gas recirculation) passages 86 provided therein with EGR control valves 90. Under predetermined operating conditions, a portion of the exhaust gas is returned to the air intake system.

The actuator 82 is connected to a throttle position sensor 92 responsive to rotation of the throttle shaft for outputting a signal proportional to the throttle opening or position TH. A manifold absolute pressure sensor 94 is installed downstream of the throttle valve 50 for outputting a signal proportional to the manifold absolute pressure PBA in the air intake pipe (engine load). In addition, an atmospheric air pressure sensor 96 is installed near the engine 16 for outputting a signal proportional to the atmospheric air pressure PA.

An intake air temperature sensor 100 installed downstream of the throttle valve 50 outputs a signal proportional to the intake air temperature TA. A first temperature sensor 102a and a second temperature sensor 102b each installed at cooling passages (not shown) connected to the water inlet (not shown) via a thermostat (not shown) of the left and right cylinder banks, output signals indicative of the temperature at those locations, and a third temperature sensor 102c installed in the exhaust manifolds 70 of one of the left and right cylinder banks outputs a signal indicative of the engine temperature TOH and the engine coolant temperature TW. Thus, the three temperature sensors 102a, 102b and 102c function as the sensors for detecting the engine temperature TOH and the engine coolant temperature TW.

$O_2$ sensors 110 installed in the exhaust manifolds 70 output signals reflecting the oxygen concentration of the exhaust gas. A knock sensor 112 installed at a suitable location on the cylinder block 104 outputs a signal related to knock.

Figure 4:
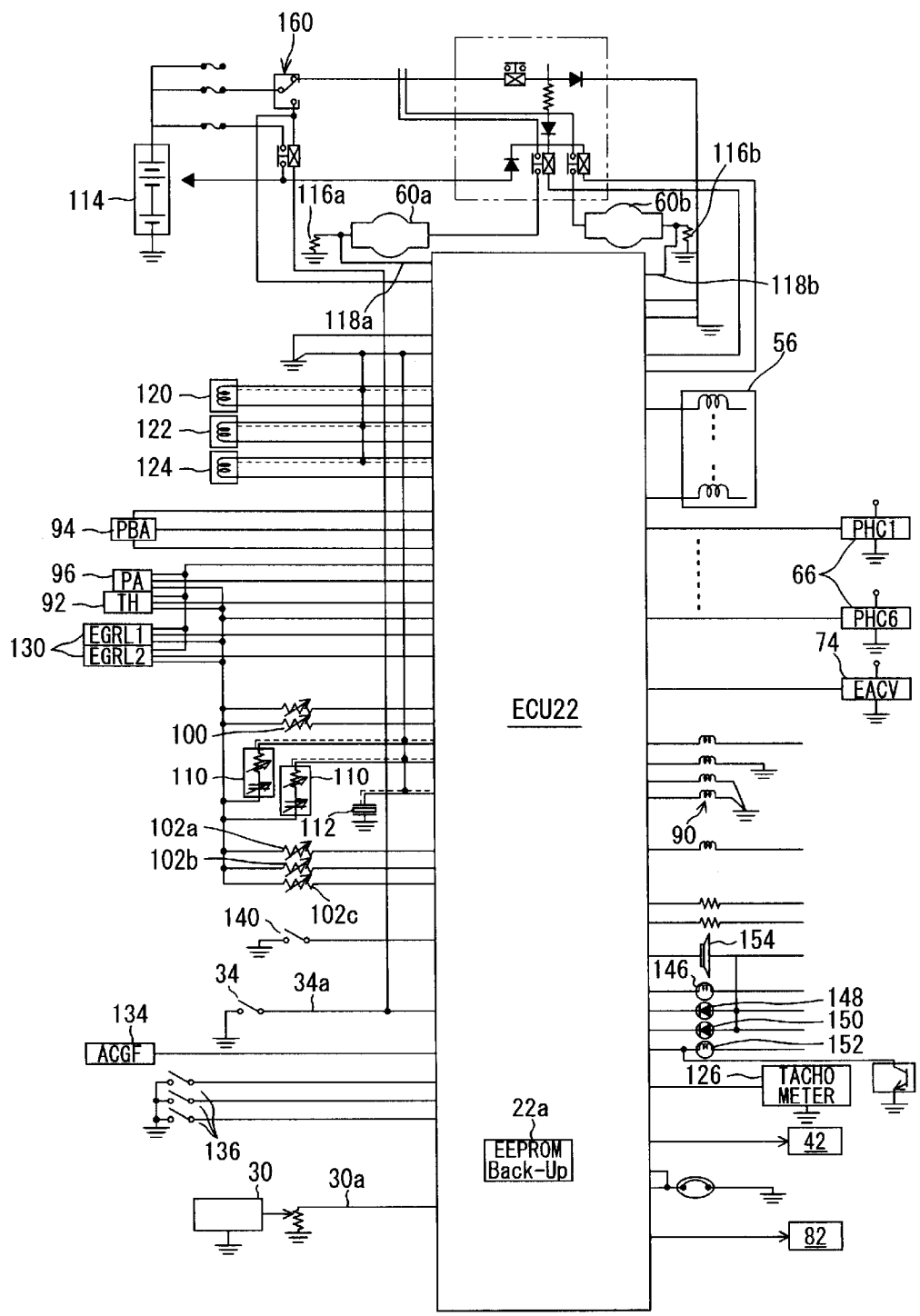
FIG. 4 is a block diagram setting out the particulars of inputs/outputs to and from the electronic control unit (ECU) shown in FIG. 1.

The explanation of the outputs of the sensors and the inputs/outputs to/from the ECU 22 will be continued with reference to FIG. 4. Some sensors and signal lines do not appear in FIG. 3.

The motors of the fuel pumps 60a and 60b are connected to an onboard battery 114 and detection resistors 116a and 116b are inserted in the motor current supply paths. The voltages across the resistors are input to the ECU 22 through signal lines 118a and 118b. The ECU 22 determines the amount of current being supplied to the motors from the voltage drops across the resistors and uses the result to discriminate whether any abnormality is present in the fuel pumps 60a and 60b.

TDC (top dead center) sensors 120 and 122 and a crank angle sensor 124 are installed near the engine crankshaft for producing and outputting to the ECU 22 cylinder discrimination signals, angle signals near the top dead centers of the pistons, and a crank angle signal once every 30 degrees. The ECU 22 calculates the engine speed NE from the output of the crank angle sensor. Lift sensors 130 installed near the EGR control valves 90 produce and send to the ECU 22 signals related to the lifts (valve openings) of the EGR control valves 90.

The output of the F terminal (ACGF) 134 of an AC generator (not shown) is input to the ECU 22. Three hydraulic (oil pressure) switches 136 installed in the hydraulic circuit (not shown) of the variable valve timing system 84 produce and output to the ECU 22 a signal related to the detected hydraulic pressure. A hydraulic switch 140 installed in the hydraulic circuit (not shown) of the engine 16 produces and outputs to the ECU 22 a signal related to the detected hydraulic pressure.

The ECU 22, which is composed of a microcomputer as mentioned earlier, is equipped with an EEPROM (electrically erasable and programmable read-only memory) 22a for back-up purposes. The ECU 22 uses the foregoing inputs to carry out the overheat detection explained later, and turns on an overheat lamp 148 and sounds a buzzer 154 when the engine 16 is detected to be overheated. It also turns on other lamps, 146, 150 and 152 when the ECU 22 becomes failed, the hydraulic pressure becomes abnormal and the AC generator fails. Together with lighting these lamps, it sounds the buzzer 154.

The operation of the illustrated overheat detection system for an outboard motor will now be explained.

Figure 5:
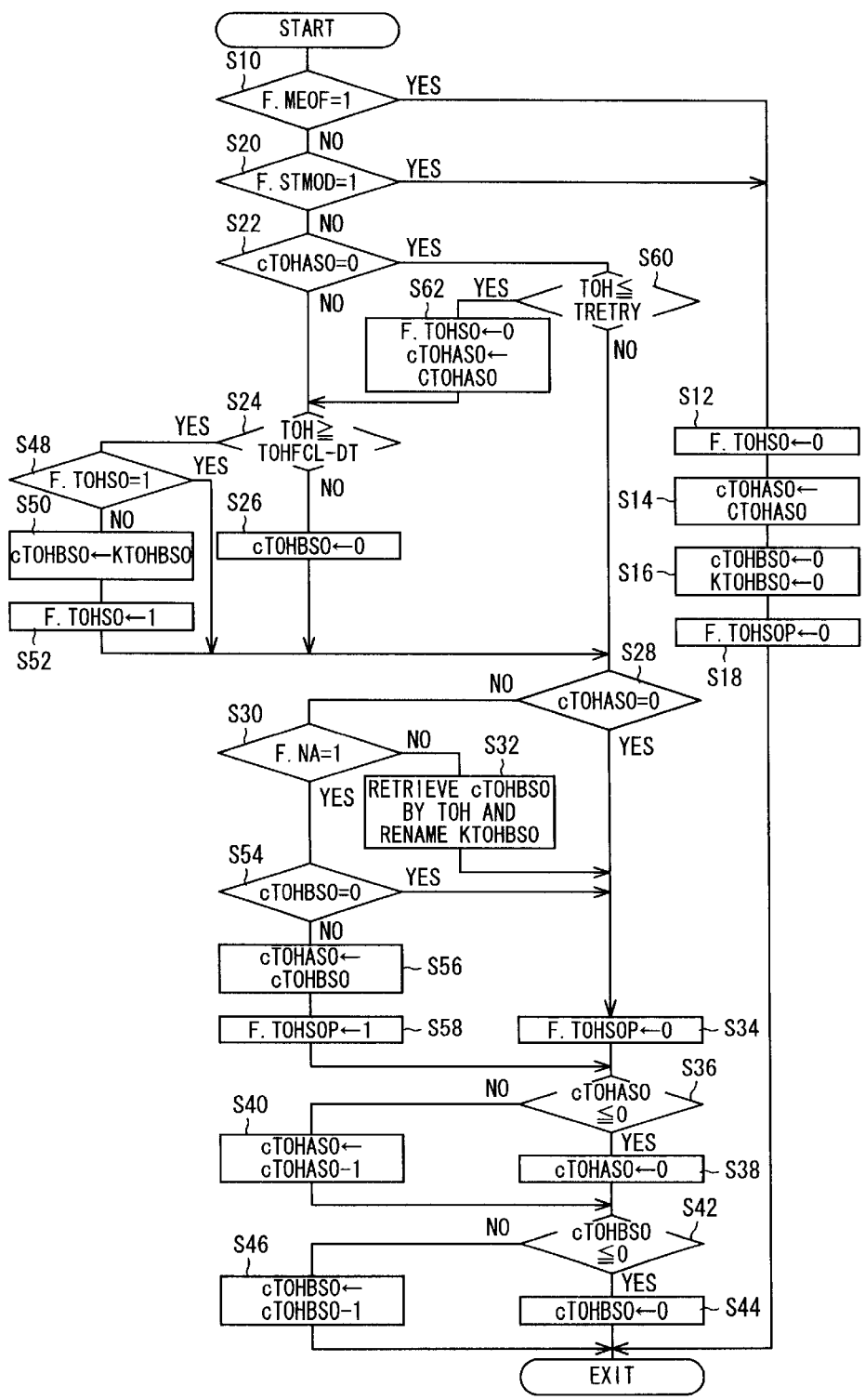
FIG. 5 is a flow chart showing the operation of the system illustrated in FIG. 1.
Figure 6:
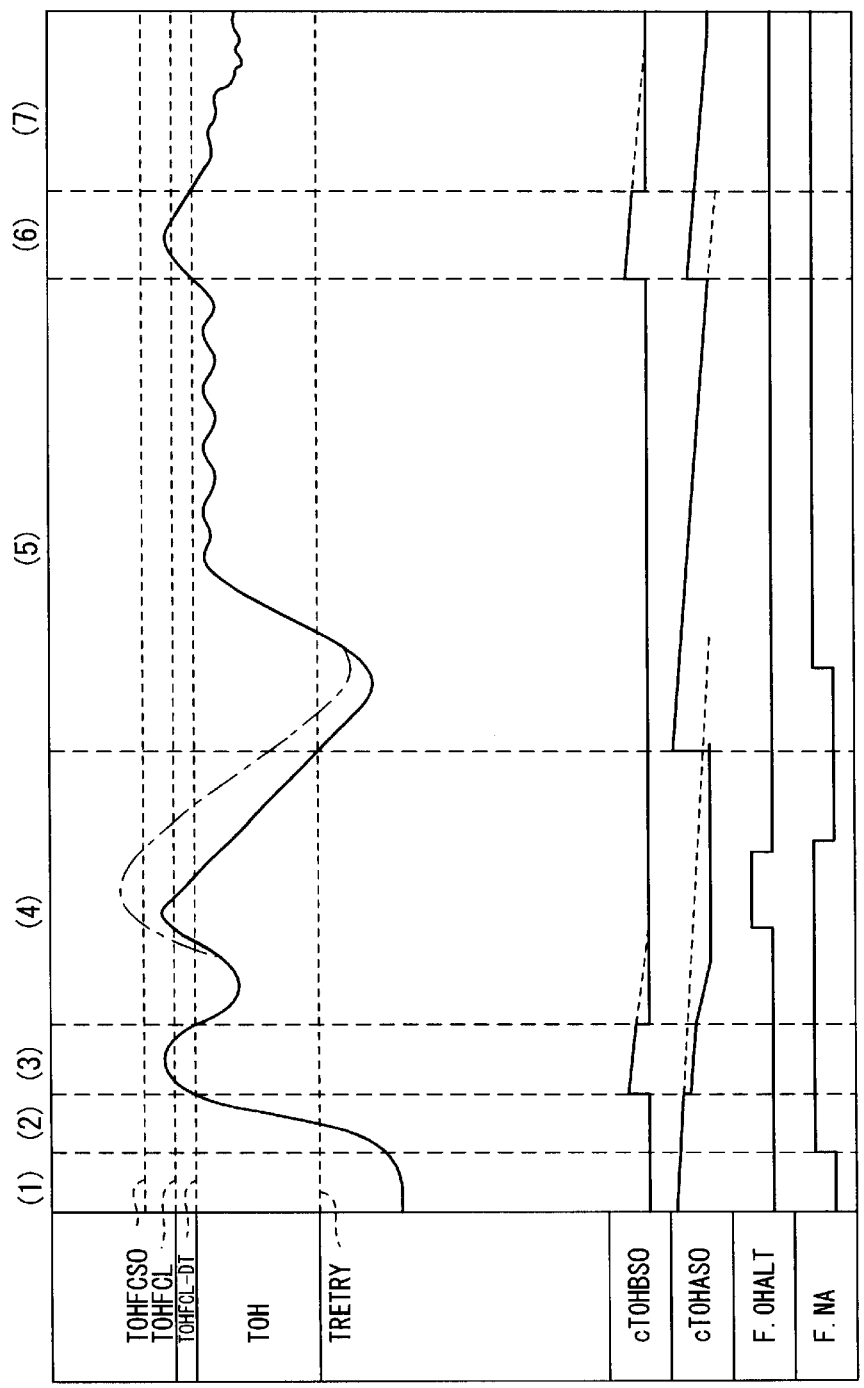
FIG. 6 is a time chart explaining the operation of the system illustrated in the flow chart of FIG. 5.

FIG. 5 is a flow chart showing the operation and FIG. 6 is a time chart explaining the operation. The illustrated program is executed when an ignition switch (indicated by reference numeral 160 in FIG. 4) is turned to the ACC position whereafter it is looped once every 100 msec.

The program begins in S10 in which it is determined whether the bit of a flag F.MEOF is set to 1. The bit of the flag is set to 1 in a routine (not shown) when the engine 16 is stopped (engine stalls).

The result of S10 is normally affirmative in the first program loop and the program proceeds to S12 in which the bit of a flag F.TOHSO (explained later) is reset to 0, and proceeds to S14 in which a predetermined value CTOHASO is set on a counter (down-counter) cTOHASO (explained later).

The program then proceeds to S16 in which a second counter (down-counter) cTOHBSO (explained later) is reset to zero and a predetermined value KTOHBSO (explained later) is reset to zero, and proceeds to S18 in which the bit of a flag F.TOHSOP (explained later) is reset to 0 and is terminated.

When the ignition switch 160 is turned to the ON (START) position, the engine 16 begins cranking. As a result, the result in S10 is negative in the next program loop and the program proceeds to S20 in which it is determined whether the bit of a flag F.STMOD is set to 1. The bit of the flag is set to 1 in a routine (not shown) when the engine 16 is in a start mode where its speed is equal to or smaller than a combustion-completed speed, while it is reset to 0 when the engine speed reaches the combustion-completed speed. The determination of this step amounts for determining whether the engine 16 is being started.

When the result in S20 is affirmative, the program proceeds to S12. When the result in S20 is negative, the program proceeds to S22 in which it is determined whether the value of the aforesaid counter cTOHASO has reached zero.

As will be explained later, the counter value cTOHASO defines a period of time (predetermined first period of time) during which a threshold value is permitted to be changed and is set to a relatively short period of time during which there could happen an event that the temperature sensor value becomes greater than a true or actual value at a high engine load immediately after engine starting. Since the counter value is set in S14 each time the result in S10 or S20 is affirmative, this amounts for determining whether it is within the predetermined first period of time since engine starting.

When the program proceeds to S22 for the first time, the result is normally negative and the program proceeds to S24 in which it is determined whether the engine temperature TOH detected by the temperature sensor 102a (or 102b) is equal to or greater than a difference (predetermined first temperature) obtained by subtracting a value DT (e.g., 5° C.) from a predetermined temperature TOHFCL).

Since the engine temperature TOH will not differ from different cylinder bank, it is determined from the output of one of the two sensor 102a and 102b among of the three. The selected sensor may be changed at an appropriate number of program loops. An average of two or three of the sensors may instead be used.

If it is the first program loop since engine starting, it is under the situation marked by (1) in the time chart of FIG. 6 and since the engine temperature TOH is low, the result in S24 is negative and the program proceeds to S26 in which the counter cTOHBSO is set with zero. The program then proceeds to S28 in which it is again determined whether the value of the counter cTOHASO has reached zero.

As shown in FIG. 6, since the counter value is not zero at that situation, the result in S28 is negative and the program proceeds to S30 in which it is determined whether the bit of a flag F.NA is set to 1. Since the bit of the flag is set to 1 in a routine (not shown) when the detected engine speed NE exceeds an idling speed (predetermined speed), this determination amounts for determining whether the engine speed NE exceeds the idling speed.

Figure 7:
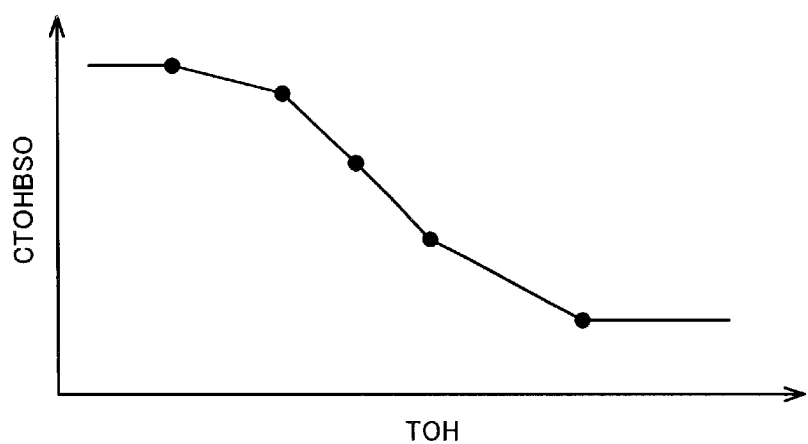
FIG. 7 is a graph for showing a characteristic of a counter value referred to in the flow chart of FIG. 5.

When the result in S30 is negative, the program proceeds to S32 in which a value CTOHBSO is retrieved from a table (whose characteristic is shown in FIG. 7) using the detected temperature TOH as address data and the retrieved value is renamed the aforesaid value KTOHBSO.

As Illustrated in FIG. 7, the value CTOHBSO is set with respect to the engine temperature TOH. More specifically, it is set to be decreased with increasing engine temperature. The reason is that, since the value defines a period of time during which the threshold value is changes (as will be explained late) to avoid erroneous (more precisely unnecessary) overheat detection and such an erroneous overheat detection could only occur before the engine starting has been completed, only a short period of time (i.e., CTOHBSO) is needed when the engine temperature TOH is high.

The program then proceeds to S34 in which the bit of the flag F.TOHSOP is reset to 0 and to S36 in which it is determined whether the value of the counter cTOHASO is equal to or smaller than zero and when the result is affirmative, the program proceeds to S38 in which the counter value is replaced with zero. When the result in S36 is negative, the program proceeds to S40 in which the counter value is decremented by one.

The program then proceeds to S42 in which it is determined whether the value of the counter cTOHBSO is equal to or smaller than zero and when the result is affirmative, the program proceeds to S44 in which the counter value is replaced by zero. When the result in S42 is negative, the program proceeds to S46 in which the counter value is decremented by one.

The above is processing in situation (1) of the time chart of FIG. 6.

Then, the engine temperature TOH continues rising as time passes by as shown in (2) in the chart and becomes equal to or greater than the difference between TOHFCL-DT as shown in (3) in the chart. The value TOHFCL is one of threshold values (generally expressed as "FCL") and indicates a threshold value for detecting the engine overheated condition under normal engine operation.

Returning to the explanation of the flow chart of FIG. 5, the result in S24 becomes affirmative for the reason mentioned above and the program proceeds to S48 in which it is determined whether the bit of the flag F.TOHSO is set to 1. Since the bit of the flag is reset to 0 in S12, the result in S48 is normally negative and the program proceeds to S50 in which the aforesaid value KTOHBSO (the value retrieved from the table in S32) is set on the counter cTOHBSO.

The program then proceeds to S52 in which the bit of the flag F.TOHSO is set to 1. To set the bit of the flag F.TOHSO to 1 indicates that the period of time during which the threshold value should be changed is finally determined. Consequently, the result in S48 becomes affirmative in a next program loop and the program skips S50 and S52. The program then proceeds to S28 in which the result is negative and proceeds to S30.

Since the engine speed rises continuously after engine starting, the bit of the flag F.NA is set to 1 as shown in (2) in the time chart of FIG. 6. As a result, the result in S30 is affirmative and the program proceeds to S54 in which it is determined whether the value of the counter cTOHBSO has reached zero. As shown in (3) in the time chart of FIG. 6, since the counter value has not reached zero at this situation, the result in S54 is negative and the program proceeds to S56 in which the value of the counter cTOHBSO is replaced with the value of the counter cTOHASO.

As illustrated in the time chart of FIG. 6, the counter cTOHBSO has a function similar to that of the counter cTOHASO. Specifically, the counter cTOHASO defines the period of time during which the change of the threshold value (in a temperature-increasing direction for avoiding erroneous or unnecessary overheat detection) is permitted, while the counter cTOHBSO, more precisely the value of the counter defines the period of time (predetermined second period of time) during which the change of the threshold value is conducted. Since the period of time for threshold value change may sometimes be longer the permitted one, in order to assign the priority in avoiding the erroneous detection, this replacement is conducted.

The program then proceeds to S58 in which the bit of the flag F.TOHSOP is set to 1. To set the bit of this flag indicates that the threshold value can be changed. When the result in S54 is affirmative, since this indicates the period of time to change the threshold value has expired, the program proceeds to S34 in which the bit of the flag F.TOHSOP is reset to 0.

Explaining the operation of the system, as mentioned above, the temperature sensor 102a (or 102b) may, depending on its location, indicate a temperature higher than a true or actual engine temperature, due to a response lag in the thermostat or the layout of the cooling passage, which makes it difficult to detect an engine overheated condition accurately. This disadvantageous is serious at high engine load immediately after engine starting.

In view of the above, it is assumed to be under a high engine load when the engine speed exceeds the idling speed (F.NA=1) before the value of the counter cTOHASO has reached zero, in other words, immediately after the engine starting where the elapsed time since engine starting is within the predetermined first period of time, the threshold value for overheat detection is changed.

Specifically, the difference obtained by subtracting the predetermined value DT from the normal threshold value TOHFCL is used as an intermediate or provisional value and when the detected engine temperature TOH becomes equal to or greater than the intermediate value, the threshold value is actually changed from TOHFCL to TOHFCSO (set in a temperature-increasing direction for avoid erroneous detection).

The overheat detection itself is conducted in a routine (not shown) by comparing the detected engine temperature TOH with the threshold value, and it is determined that the engine 16 is overheated when the detected engine temperature TOH exceeds the threshold value. With this, even if the detected value indicates a temperature higher than a true or actual temperature at, for example, a high engine load immediately after engine starting, the system can prevent it from being determined unnecessarily as the overheated condition.

On the other hand, as shown in (4) in the time chart of FIG. 6, when the detected temperature TOH exceeds, in fact, the threshold value TOHFCSO as illustrated by a phantom line, it can be estimated that the temperature would actually have risen. Therefore, it is determined that the overheat condition has occurred and the bit of a flag F.OHALT (illustrated at the bottom of the chart) is set to 1, thereby enabling to detect the overheat condition, without fail.

Returning to the explanation of the flow chart of FIG. 5, explanation will be made on the overheat detection, when engine 16 is left in the idling state and hence, the engine temperature TOH drops.

In that situation, when the result in S22 is affirmative indicating the value of the counter cTOHASO has reached zero, the program proceeds to S60 in which it is determined whether the detected engine temperature TOH is equal to or less than a reset temperature TRETRY (predetermined second temperature). When the result in S60 is negative, the program proceeds to S28. When the result in S60 is affirmative, the program proceeds to S62 in which the bit of the flag F.TOHSO is again reset to 0 and the counter cTOHASO is again set with the value CTOHASO, and proceeds to S24.

Explaining this with reference to the time chart of FIG. 6, as shown in (4)(5) in the chart, the engine temperature TOH drops gradually when the engine 16, after warmed up, is left in the idling state for a long period of time. If the engine load become high suddenly from this situation, the same problem as that experienced just after engine starting could occur.

In view this, in the system in the embodiment, when it is determined that the elapsed time since engine starting exceeds cTOHASO (predetermined first period of time), it is determined whether the engine temperature TOH becomes equal to or smaller than the reset temperature TRETRY (set lower than the predetermined first temperature TOHFCL-DT). And, if TOH is equal to or smaller than TRETRY, the threshold value FCL is changed to TOHFCSO, even if TOH exceeds TOHFCL-DT in a certain period of time (i.e., the predetermined first period of time) and in addition, the bit of the flag F.NA is set to 1 (indicating that the engine speed exceeds the idling speed).

With this, even in the situation where the engine temperature TOH drops gradually because the engine 16, after warmed up, is left in the idling state for a long period of time as illustrated in (4)(5) in the time chart of FIG. 6, when the engine load become high suddenly, the system can prevent unnecessary overheat detection.

The embodiment is thus configured to have a system for detecting overheat of an internal combustion engine 16 for an outboard motor mounted on a boat 12, whose output is connected to a propeller 40 such that the boat is propelled forward or reverse, comprising: a temperature sensor 102a (102c), installed at the engine, which outputs a signal indicative of a temperature of the engine TOH; a crank angle sensor 124, installed at the engine, which outputs a signal indicative of a speed of the engine; time measuring means (ECU 22, S22, S28) for measuring a period of time since starting of the engine; time determining means (ECU 22, S22, S28) for determining whether the measured time is within a predetermined first period of time (cTOHASO); temperature determining means (ECU 22, S24) for determining whether the detected engine temperature TOH is equal to or greater than a first predetermined temperature (TOHFCL-DT) (; engine speed determining means (ECU 22, S30) for determining whether the detected engine speed NE exceeds a predetermined speed; threshold value changing means (ECU 22, S58) for changing a threshold value TOHFCL to a value TOHFCSO set in a temperature-increasing direction, when the measured time is determined to be within the predetermined first period of time, the detected engine temperature is determined to be equal to or greater than the first predetermined temperature and the detected engine speed is determined to exceed the predetermined speed; and overheat determining means (ECU 22) for comparing the detected engine temperature with the threshold value and for determining that the engine is overheated when the detected engine temperature is determined to exceed the threshold value.

In the system, the threshold value changing means continues to change the threshold value for a predetermined second period of time (cTOHBSO; ecu 22, S54), and the predetermined second period of time is determined based on the detected engine temperature (TOH; ECU 22, S32).

The system further includes second temperature determining means (ECU 22, S60) for determining whether the detected engine temperature TOH is equal to or smaller than a second predetermined temperature TRETRY which is set to be lower than the predetermined first temperature, when the measured time is determined to exceed the predetermined first period of time, and the threshold value changing means changes the threshold value to the value set in the temperature-increasing direction, when the detected engine temperature is equal to or smaller than the second predetermined temperature (ECU 22, S62, S58).

In the system, the threshold value changing means continues to change the threshold value for a predetermined second period of time (cTOHBSO) and the predetermined second period of time is determined based on the detected engine temperature (TOH, ECU 22, S32).

With this, even if the detected engine temperature is higher than a true or actual temperature at, for example, a high engine load immediately after engine starting or when the engine has been left in the idling state, the system can prevent it from being determined unnecessarily as the overheated condition and can detect the overheat accurately.

Further, in the system according to the embodiment, since the threshold value is changed to the temperature-increasing value TOHFCSO during the predetermined second period of time cTOHBSO), the overheat detection can be shifted to the normal manner (using the normal threshold value) immediately after the engine warmup has been completed.

Further, since the value CTOHBSO (KTOHBSO) is determined based on the engine temperature TOH, the returning to the normal overheat detection can be securely effected at a time when the engine warmup has just completed.

Moreover, since the determination to threshold value change is conducted each time the program loops at intervals of 100 msec and the number of determination is counted by the counters cTOHASO and cTOHBSO that measure the predetermined first and second period of time (cTOHASO, cTOHBSO), the configuration is made simple.

It should be noted that, although the invention has been explained with reference to an embodiment of an outboard motor, the invention is not limited in application to an outboard motor but can also be applied to an inboard motor.

The entire disclosure of Japanese Patent Application No. 2001-315850 filed on Oct. 12, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting overheat of an internal combustion engine for an outboard motor mounted on a boat, whose output is connected to a propeller such that the boat is propelled forward or reverse, comprising:

a temperature sensor, installed at the engine, which outputs a signal indicative of a temperature of the engine;

a crank angle sensor, installed at the engine, which outputs a signal indicative of a speed of the engine;

time measuring means for measuring a period of time since starting of the engine;

time determining means for determining whether the measured time is within a predetermined first period of time;

temperature determining means for determining whether the detected engine temperature is equal to or greater than a first predetermined temperature;

engine speed determining means for determining whether the detected engine speed exceeds a predetermined speed;

threshold value changing means for changing a threshold value to a value set in a temperature-increasing direction, when the measured time is determined to be within the predetermined first period of time, the detected engine temperature is determined to be equal to or greater than the first predetermined temperature and the detected engine speed is determined to exceed the predetermined speed; and overheat determining means for comparing the detected engine temperature with the threshold value and for determining that the engine is overheated when the detected engine temperature is determined to exceed the threshold value.

2. A system according to claim 1, wherein the threshold value changing means continues to change the threshold value for a predetermined second period of time.

3. A system according to claim 2, wherein the predetermined second period of time is determined based on the detected engine temperature.

4. A system according to claim 1, further including:

second temperature determining means for determining whether the detected engine temperature is equal to or smaller than a second predetermined temperature which is set to be lower than the predetermined first temperature, when the measured time is determined to exceed the predetermined first period of time, and the threshold value changing means changes the threshold value to the value set in the temperature-increasing direction, when the detected engine temperature is equal to or smaller than the second predetermined temperature.

5. A system according to claim 4, wherein the threshold value changing means continues to change the threshold value for a predetermined second period of time.

6. A system according to claim 5, wherein the predetermined second period of time is determined based on the detected engine temperature.

7. A method of detecting overheat of an internal combustion engine for an outboard motor mounted on a boat, whose output is connected to a propeller such that the boat is propelled forward or reverse, comprising the steps of:

detecting a temperature of the engine;

detecting a speed of the engine;

measuring a period of time since starting of the engine;

determining whether the measured time is within a predetermined first period of time;

determining whether the detected engine temperature is equal to or greater than a first predetermined temperature;

determining whether the detected engine speed exceeds a predetermined speed;

changing a threshold value to a value set in a temperature-increasing direction, when the measured time is determined to be within the predetermined first period of time, the detected engine temperature is determined to be equal to or greater than the first predetermined temperature and the detected engine speed is determined to exceed the predetermined speed; and comparing the detected engine temperature with the threshold value and for determining that the engine is overheated when the detected engine temperature is determined to exceed the threshold value.

8. A method according to claim 7, wherein the step of threshold value changing continues to change the threshold value for a predetermined second period of time.

9. A method according to claim 8, wherein the predetermined second period of time is determined based on the detected engine temperature.

10. A method according to claim 7, further including the step of:

determining whether the detected engine temperature is equal to or smaller than a second predetermined temperature which is set to be lower than the predetermined first temperature, when the measured time is determined to exceed the predetermined first period of time, and the step of threshold value changing changes the threshold value to the value set in the temperature-increasing direction, when the detected engine temperature is equal to or smaller than the second predetermined temperature.

11. A method according to claim 10, wherein the step of threshold value changing continues to change the threshold value for predetermined second period of time.

12. A method according to claim 11, wherein the predetermined second period of time is determined based on the detected engine temperature.

* * * * *